(12) United States Patent
Kurukchi et al.

(10) Patent No.: US 7,744,067 B2
(45) Date of Patent: Jun. 29, 2010

(54) THREE PHASE VAPOR DISTRIBUTOR

(75) Inventors: Sabah A. Kurukchi, Houston, TX (US);
Joseph M. Gondolfe, Cypress, TX (US);
John A. Stippick, Houston, TX (US);
Kenneth J. Fewel, Jr., Houston, TX (US)

(73) Assignee: Stone & Webster Process Technology, Inc., Houston, TX (US)

( * ) Notice: Subject to any disclaimer, the term of this patent is extended or adjusted under 35 U.S.C. 154(b) by 901 days.

(21) Appl. No.: 11/595,419

(22) Filed: Nov. 10, 2006

(65) Prior Publication Data
US 2007/0251384 A1 Nov. 1, 2007

Related U.S. Application Data

(60) Provisional application No. 60/796,765, filed on May 1, 2006.

(51) Int. Cl.
*B01F 3/04* (2006.01)
(52) U.S. Cl. .......................... 261/79.2; 261/96; 261/97; 261/109; 261/110; 210/787
(58) Field of Classification Search ............... 261/79.2, 261/96, 97, 98, 102, 105, 109, 110; 210/787, 210/788
See application file for complete search history.

(56) References Cited

U.S. PATENT DOCUMENTS

| | | | | |
|---|---|---|---|---|
| 1,790,596 A | * | 1/1931 | Schneible | 261/79.2 |
| 1,794,986 A | * | 3/1931 | Schneible | 261/79.2 |
| 2,767,967 A | | 10/1956 | Hutchinson | |
| 3,348,364 A | * | 10/1967 | Henby | 96/300 |
| 3,651,619 A | * | 3/1972 | Miura | 96/314 |
| 4,435,196 A | | 3/1984 | Pielkenrood | |
| 4,770,747 A | * | 9/1988 | Muller | 202/176 |
| 5,106,544 A | | 4/1992 | Lee et al. | |
| 5,516,465 A | | 5/1996 | Yeoman | |
| 5,558,818 A | * | 9/1996 | Gohara et al. | 261/17 |
| 5,605,654 A | | 2/1997 | Hsieh et al. | |
| 5,632,933 A | | 5/1997 | Yeoman et al. | |
| 6,309,553 B1 | | 10/2001 | Lanting et al. | |
| 6,341,765 B1 | | 1/2002 | Moser | |
| 6,889,962 B2 | * | 5/2005 | Laird et al. | 261/79.2 |
| 6,948,705 B2 | * | 9/2005 | Lee et al. | 261/79.2 |
| 6,997,445 B2 | * | 2/2006 | Vedrine | 261/96 |
| 7,281,702 B2 | * | 10/2007 | Jacobs et al. | 261/79.2 |
| 2003/0188851 A1 | * | 10/2003 | Laird et al. | 165/132 |
| 2005/0029686 A1 | * | 2/2005 | Laird et al. | 261/96 |
| 2005/0146062 A1 | | 7/2005 | Laird et al. | |

OTHER PUBLICATIONS

International Search Report, PCT/US07/10497, Oct. 2007.

* cited by examiner

*Primary Examiner*—Scott Bushey
(74) *Attorney, Agent, or Firm*—Locke Lord Bissell & Liddell LLP; Alan B. Clement; Peter J. Fallon

(57) ABSTRACT

A mass and/or heat transfer column is provided with a multiphase vapor distributor with distributes a vapor stream about the inner periphery of the column.

32 Claims, 15 Drawing Sheets

Velocities in the Quadrants below Tray 20

THREE PHASE VAPOR DISTRIBUTOR

CROSS REFERENCE TO RELATED APPLICATIONS

The present application claims priority from provisional patent application Ser. No. 60/796,765 filed on May 1, 2006.

BACKGROUND OF THE INVENTION

This invention relates in general to a gas distributor flute designed to provide uniform gas flow in the trays or packing of a fractionation column, such as in a hydrocarbon processing facility.

More specifically, the present invention relates to a device that conditions ultra high entrance velocity feed gases, which also include liquids and/or solids, from a single or multiple feed nozzles to a quiescent flow regime for uniform distribution of the gases, liquids and solids to a contact device within a distillation or fractionation column. The present invention allows for the disengagement of the gaseous flow from the liquid flow while effectively and concomitantly accommodating separation of (high) solids from the multiphase vapor flow.

Vapor, liquid and solid interaction occurs in many types of mass transfer and heat exchange processes. Typically, a vapor stream is introduced into a separation column below a region containing trays or random or structured packing while the liquid stream is introduced into the column above the trays or packing. The vapor and liquid streams then flow in countercurrent relation through the region, with the trays or packing serving to distribute the downwardly flowing liquid stream over a larger surface area to enhance the mass heat transfer interaction with the upwardly flowing vapor stream.

In order to increase the efficiency of the mass transfer or heat exchange taking place between the vapor and liquid streams, it is important that the vapor be uniformly distributed across the horizontal cross-section of the column, particularly at the lower vapor-liquid interface where the vapor enters the packing. When the vapor is introduced to the column below the packing, the velocity of the vapor can prevent the desired horizontal distribution of the vapor prior to its entry into the packing. In order to improve the vapor distribution, deflectors have been positioned in some columns in the flow path of the vapor to deflect the vapor in a plurality of directions.

Another problem with the prior art processes is that there is often a need to separate entrained or slugs of liquids and solids from the gaseous feed(s) to fractionation towers. In the prior art this typically has been accomplished by the use of a knockout drum placed upstream of the fractionation tower. The purpose of this procedure is to keep unwanted liquid and solid contaminants out of the absorption or distillation process. The use of the knock out drum, however, adds to the complexity and cost of the process by adding another piece of equipment. It would represent an advancement in the state of the art and solve a long felt need in the art if the knock out drum could be eliminated and the liquids and solids could be removed internal to the separation column.

An example of a conventional vapor distributor, known as a vapor horn, is disclosed in U.S. Pat. No. 5,106,544 (incorporated herein by reference). The vapor horn disclosed in that patent comprises an annular housing that is open at the bottom. The vapor horn contains a plurality of vanes that extend upwardly at progressively greater distances into the housing through the open bottom causing downward deflection of the circumferentially flowing vapor stream. The downwardly deflected vapor then is said to rise in a uniform manner into a packing bed that is positioned radially inwardly from the vapor horn.

While circumferential vapor horns can function satisfactorily in many applications, it has been determined that a poor distribution of the vapor stream may result under certain operating conditions. This poor distribution is believed to be caused by the vapor stream traveling through a swirling or cyclonic flow path after it is discharged from the vapor horn. A low velocity zone is created in the center of the column and a high velocity zone is created adjacent the inner wall of the vapor horn as a result of this cyclonic vapor flow. These velocity differentials reduce the amount of vapor entering the center portion of the overlying packing and increase the amount of vapor in the radial outer portions of the packing. Once the vapor has entered the packing, this poor distribution of vapor cannot be corrected readily and reduces the efficiency of the mass transfer occurring within the trays or packing.

U.S. Pat. No. 5,605,654 (incorporated herein by reference) describes a method and apparatus for a vapor distributor that is capable of separating gaseous and liquid medium by circulating a vapor stream about an inner periphery of a column. The vapor stream is discharged from the distributor through an at least partially open bottom and, optionally, a plurality of spaced apart outlet ports in an inner annular wall of the distributor. A deflector extends upwardly along the inner annular wall to deflect the vapor stream away from a circumferential flow path along the inward face of the wall. The deflector also may extend outwardly under the flow channel to deflect, in a radially inward direction, vapor exiting the flow channel through the open bottom of the distributor. U.S. Pat. No. 5,632,933 (incorporated herein by reference) describes a vapor distributor having a deflecting surface that directs a vapor stream about the inner periphery of a column. The vapor horn of this device employs deflectors spaced throughout a vapor flow path to alter the direction and speed of a gaseous and liquid medium.

The need exists in the art for a vapor distribution device that can separate solid, liquid and gaseous mixed phases and provide a uniform distribution of vapor to the trays or packing in a column. The prior art does not teach a device that is capable of separating all three phase when they are introduced simultaneously from a feed nozzle into a column for fractionation and/or other chemical processing.

While conventional vapor distributors can function satisfactorily in many applications, a need has arisen for an improved vapor distributor that will provide a more uniform distribution of vapor across the horizontal cross-section of a mass transfer or heat exchange column.

SUMMARY OF THE INVENTION

The present invention overcomes the drawbacks of the prior art through the use of several innovative features. One is the novel spacing of vapor deflectors located at predetermined positions within the inner chamber of the vapor distributor in combination with conical outlet ports in the floor of the vapor distributor. These advantages allow for the separation of solid, liquid and gaseous phases when introduced simultaneously from a feed nozzle into the vapor distributor. Additionally, the location and use of windows with louvers, and chimneys with high hats located throughout the inner chamber of the vapor distributor aid in producing the novel results achieved by the present three phase vapor distributor. It will be understood that the phrase "multi-phase mixture" comprises a mixture of all three phases that may be introduced into the vapor distributor, namely, gas, liquids and solids. Prior art references have been unable to achieve a three phase separation and, therefore, have the marked disadvantage of coke build up in their vapor distributors due to the presence of solids, especially coke, in the multiphase vapor fed to the fractionator or other similar apparatus.

In preferred embodiments of the present invention, the windows with louvers and/or chimneys with high hats of the present invention may be fitted with filtration and/or separation elements, such as, knit mesh pads or other filter media to increase the distribution of the multi-phase mixture. Also, the vapor inlet optionally may be fitted with a cyclonic or vane type filtration or separation element. These filtration and/or separation elements can practically eliminate the liquid and/or solid phase contaminants in the feed gas while the vapor flute serves as the distributor/contactor of gas to the vessel internals. This combination of features is advantageous because it eliminates or at least reduces the need for an external vessel to separate contaminate phases from the multi-phase mixture and provides gas distribution and extra mass and heat transfer in the vessel simultaneously. The velocity of the feed as it passes through the windows and chimneys can be adjusted for various filtration elements to operate properly. There are various filtration and/or separation elements known in the art that will separate solids and/or liquids in the vertical or horizontal positions as used in the side windows and vertical chimneys of the present invention.

One of the processes that the present vapor distributor may be employed with is hydrocarbon pyrolysis cracking, especially in the fractionation of cracked multiphase vapor streams. In the quench water tower or the fractionation process, multiphase vapor leaves a furnace after the heating of hydrocarbon materials. This multiphase vapor contains three phases of the hydrocarbon material, namely, gas, liquid and solid. The gas employed contains the more valuable components and is recovered in a fractionation column. The liquid and solid phases are less valuable products that must be removed for efficient processing of the hydrocarbon material. While some prior art references, as described above, have developed methods and devices to remove the liquid phase from the vapor, none have been able to remove the solid phase. This solid phase, which in hydrocarbon processing generally comprises coke particles, will cause deposits in the vapor distributor and throughout the fractionation column or other downstream processing equipment. These deposits reduce the overall efficiency of the column and require frequent cleaning for their removal.

The present invention further employs the novel use of conical nozzles in the floor of the vapor distributor to allow for removal of liquid and solid waste from the main vapor channel. Below the vapor distributor is a column sump that collects the liquid and solids. The interior walls of the vapor distributor also preferably are provided with vertical openings near the floor of the vapor distributor that allow for overflow of liquid when the liquid level reaches the height of the vertical openings, and thereby prevents flooding of the multiphase vapor flow channel.

Additionally, the present invention has been shown to decrease significantly the maximum local gas velocity below the packing trays in the portion of the column situated above the vapor distributor. This reduction in local gas velocity results in a more uniform distribution of vapor pressure and ultimately a more efficient fractionation. An even distribution of the vapor on the trays is critical for proper fractionation. Even distribution can be accomplished to a degree higher than previously thought possible through the use of the vapor distributor of the present invention, which allows the conventionally designed capacity profile of a given column to be exceeded well beyond its traditionally accepted limitations. This results in higher capacity within the same column relative to similar devices that do not employ the vapor distribution device of the present invention. The vapor distributor of the present invention has been shown to significantly decrease the maximum local velocity below a packing or tray in a column and therefore improve the velocity profile below the tray. Prior art vapor distributors produce vapor distributions wherein a high percentage of the area below a tray possesses divergent velocities. An improved velocity profile is evidenced in the vapor distributor of the present invention by a uniform distribution of vapor velocities below a given tray in the column to be utilized. The novel features of the present invention have been shown to produce this uniform distribution of vapor pressure at a level above any known prior art. Specifically, the present invention produces a 60-70% greater level of uniformity, than the known prior art. This leads to a heightened efficiency in the trays or packing of the column.

It is an object of this invention to provide an improved vapor distributor for use with large volume separation towers, including but not limited to, quench oil and/or quench water services within a petrochemical plant.

It is a further object of this invention to provide an improved vapor distributor for use in other processing equipment, including but not limited to main fractionators, decoking towers and superfractionators equipped with packing or trays, including but not limited to RIPPLE® TRAYS.

It is another object of this invention to provide a novel multi phase distributor that is of a simple design and easily may be installed in a column and yet provides uniform horizontal distribution of vapor entering the column.

To accomplish these and other related objects, in one aspect the invention is directed to a multiphase vapor distributor for a mass transfer and/or a heat exchange column comprising: a column comprising an open internal shell and having a generally vertical center axis; at least one vapor inlet nozzle extending through said column shell for directing a multiphase vapor stream in a generally circumferential direction into a generally annularly-shaped multiphase vapor distributor within the column. The multiphase vapor distributor comprises a generally annular upright interior deflecting surface spaced radially inwardly from the vapor inlet nozzle and a ceiling and a floor extending between the internal deflecting wall and the column shell to substantially close the top and bottom of the distributor, the deflecting surface being shaped and positioned in relation to the vapor inlet nozzle to direct the vapor stream circumferentially about an outer periphery of the column interior. Deflector plate(s) are positioned within the vapor distributor in spaced relationship from the vapor inlet nozzle(s) to direct the multiphase vapor stream along the outer periphery of the column shell until the multiphase vapor stream reaches a rear baffle that stops the forward momentum of the multiphase vapor stream, facilitating separation of the vapor from the solids and liquids, and causing the vapor stream to back mix and exit the distributor through one of the windows or chimneys. The vapor distributor is provided with a plurality of windows positioned throughout the internal deflecting wall, and chimneys positioned throughout the ceiling, to allow for the separated vapors to exit the distributor into the column interior with greatly slowed and uniform velocity for distribution to trays or packing located within the column and above the distributor. The distributor also is provided with conical outlet nozzles located in the floor of the vapor distributor to allow the liquids and solids to exit the distributor to a sump located below the distributor in the column.

DETAILED DESCRIPTION OF THE INVENTION

Figure 1:
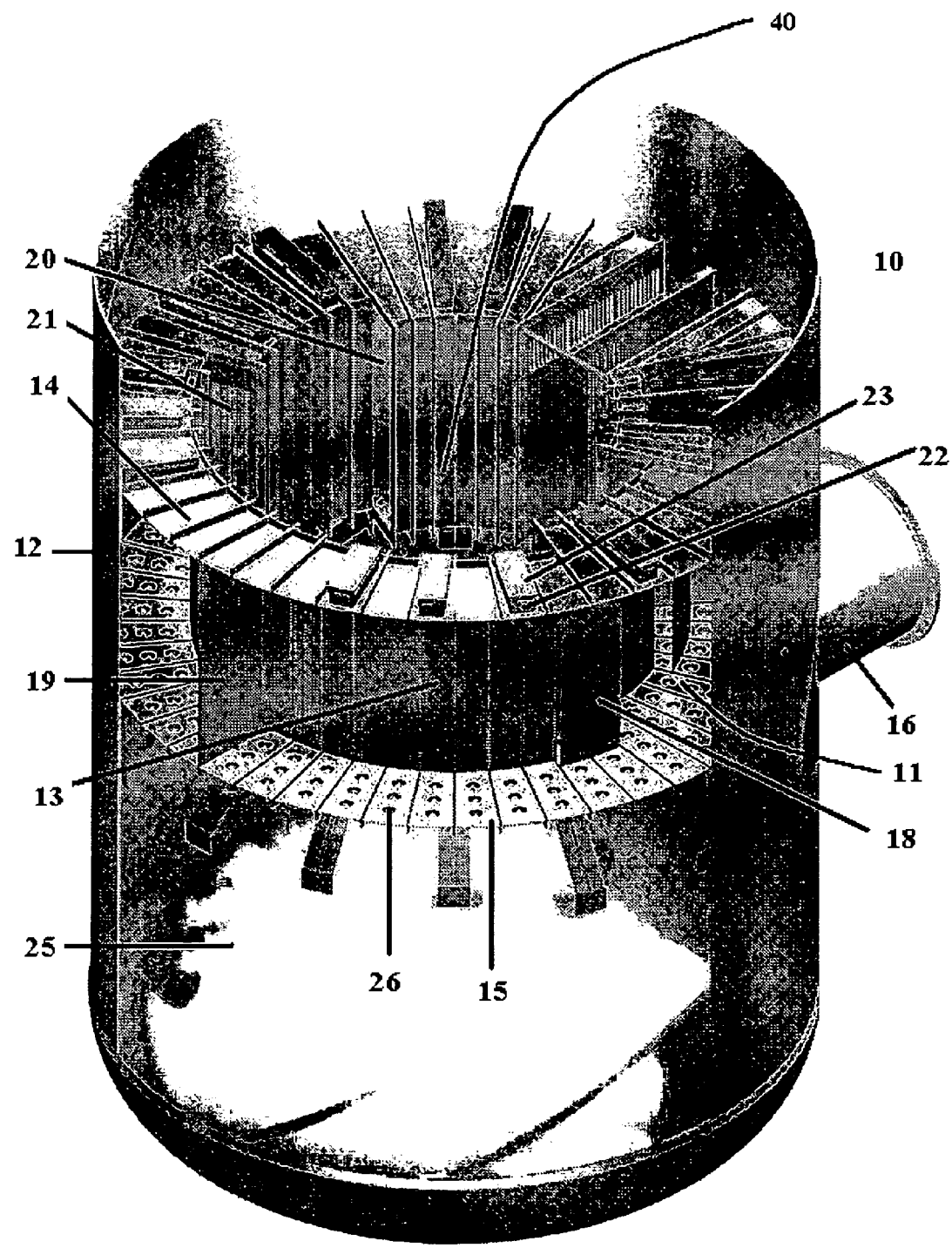
FIG. 1 shows a preferred vapor distribution flute of the present invention located above the column sump at the level of the feed nozzles.
Figure 3:
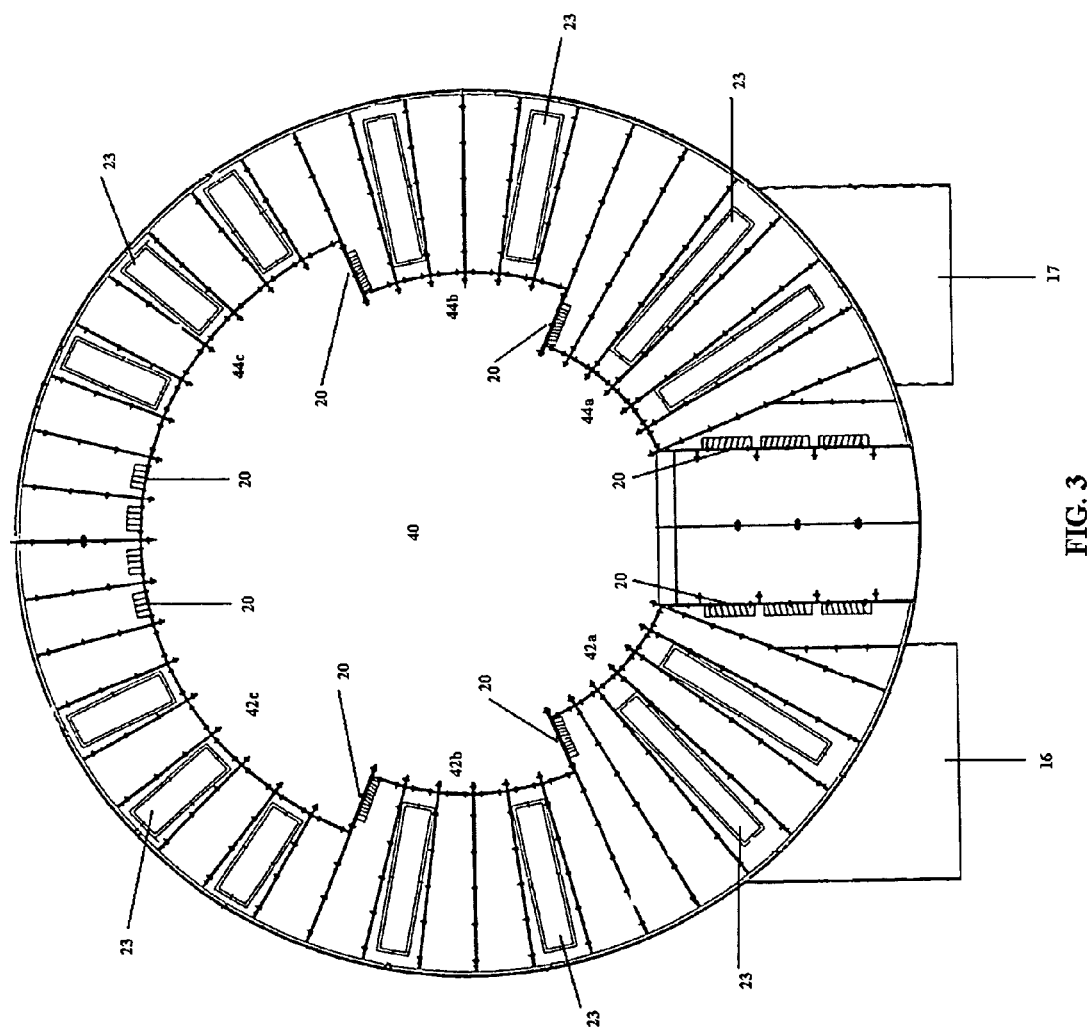
FIG. 3 shows a top view of the ceiling of a preferred vapor distribution flute of the present invention.
Figure 4:
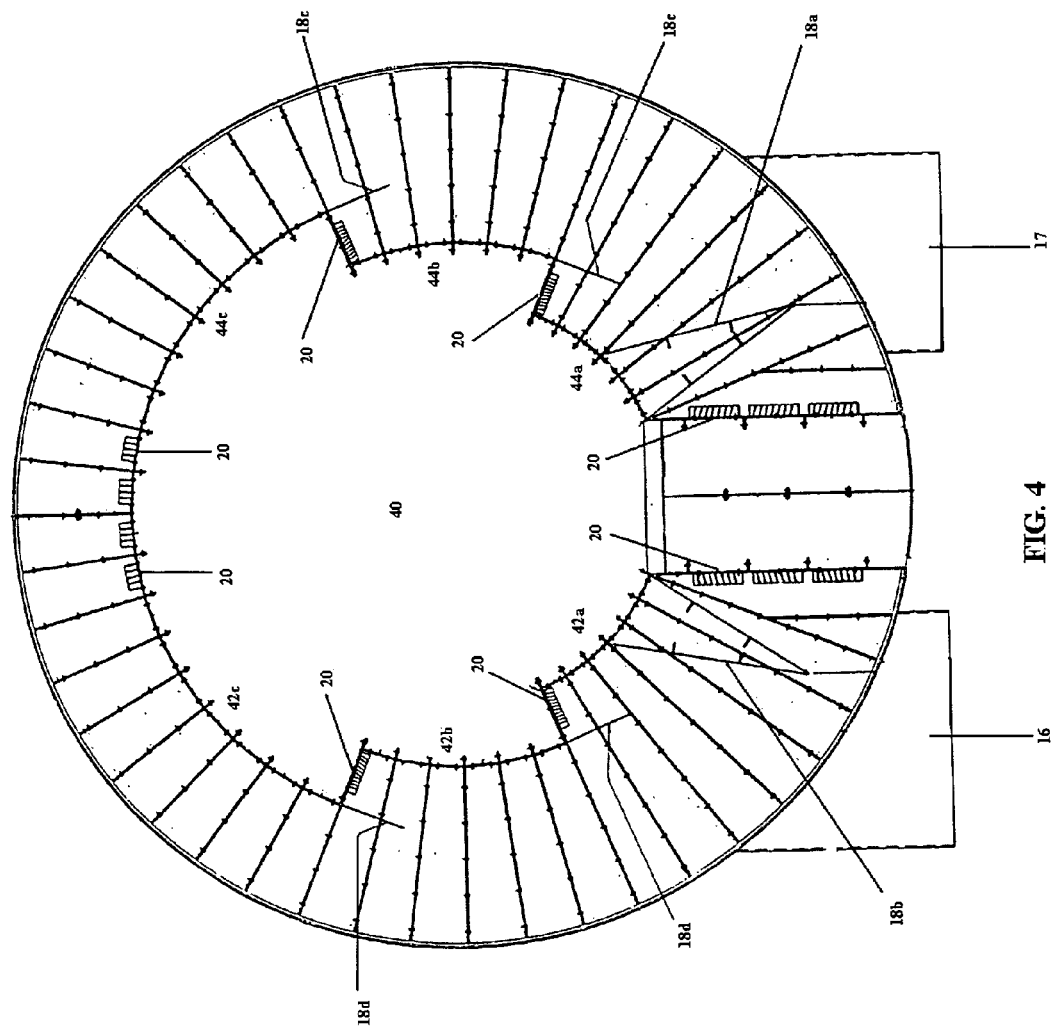
FIG. 4 shows a top view of the middle of a preferred vapor distribution flute of the present invention.
Figure 5:
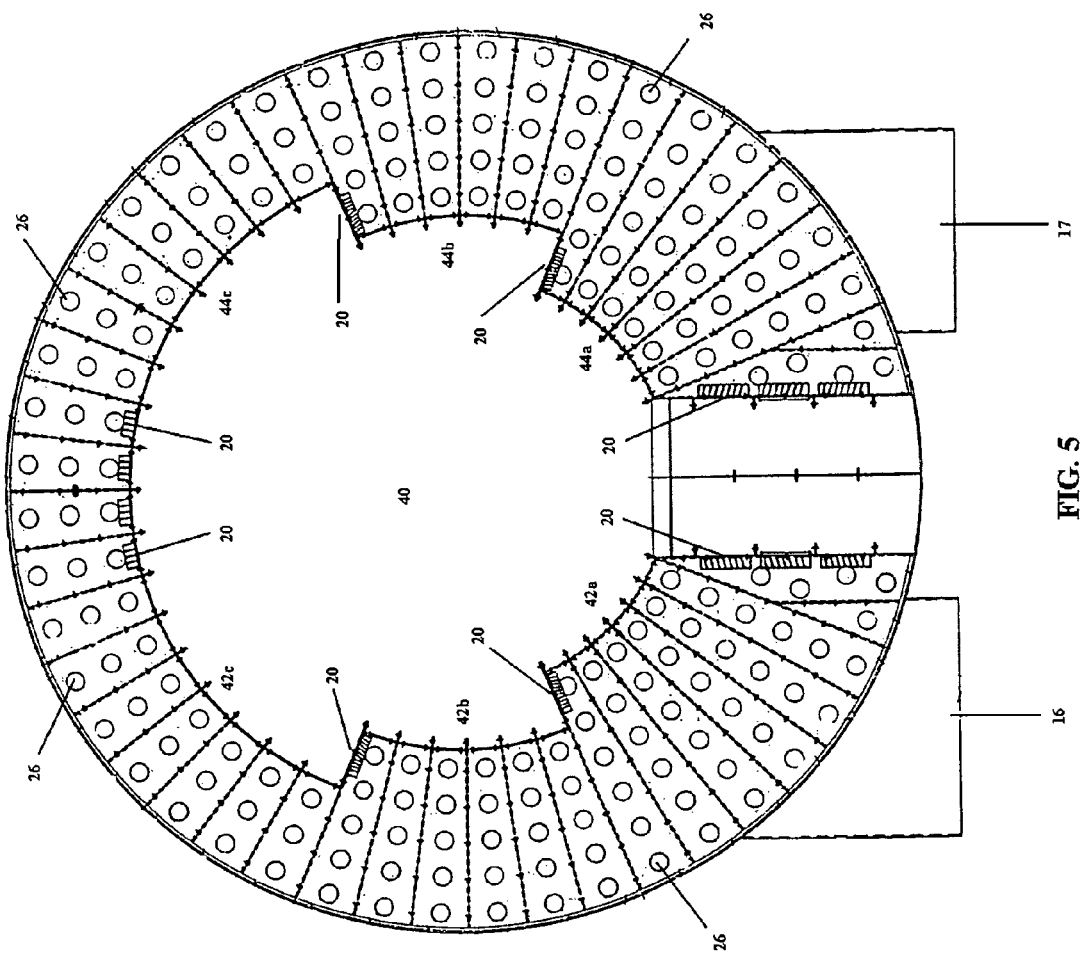
FIG. 5 shows a top view of the floor of a preferred vapor distribution flute of the present invention.
Figure 6:
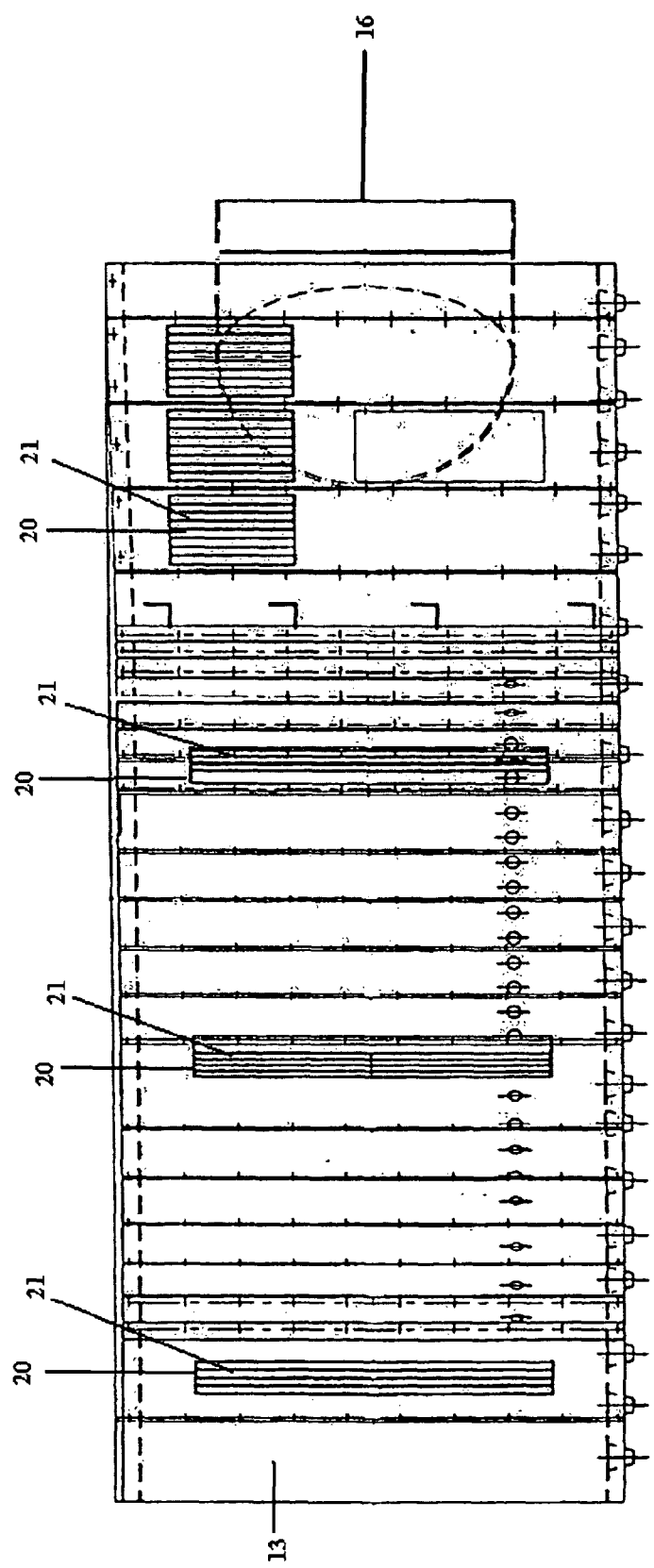
FIG. 6 shows a view of deflector walls for use with a preferred vapor distribution flute of the present invention.

FIG. 1 depicts one embodiment of the present invention. The vapor distributor or vapor flute, depicted generally as (10), is shown within a column for mass transfer and/or heat transfer. The column can be any type of column for mass transfer and/or heat transfer, including but not limited to, a distillation or fractionation column, absorption, stripping, quench oil and/or quench water towers, main fractionators, decoking towers and superfractionators. The column can be of any desired shape, including, but not limited to circular, oval, square, rectangular or other polygonal cross section. FIGS. 3-5 are top views of the vapor distributor, specifically the top, the middle and the bottom of the vapor distributor, respectively. In FIG. 1, a channel (11) is formed from the enclosure created by an exterior column wall (12) and the interior deflector wall (13). The vapor distributor (10) further possesses a ceiling (14) and a floor (15) to define the vapor flow channel (11). Vapor feed is introduced into the channel (11) through at least one inlet vapor nozzle (16, 17) in a direction generally perpendicular to the height of the column. The vapor current flows though the channel (11) circumferentially along the exterior column wall (12) due to centrifugal forces and the high rate at which the vapor is introduced into the vapor distributor (10). The walls, ceiling and floor of the vapor distributor may be constructed of any material suitable for the mass and or heat transfer processes that will not be susceptible to degradation from high velocity vapor flow of volatile chemicals, liquids and solid particulates, as is well known to those skilled in the art.

Figure 2:
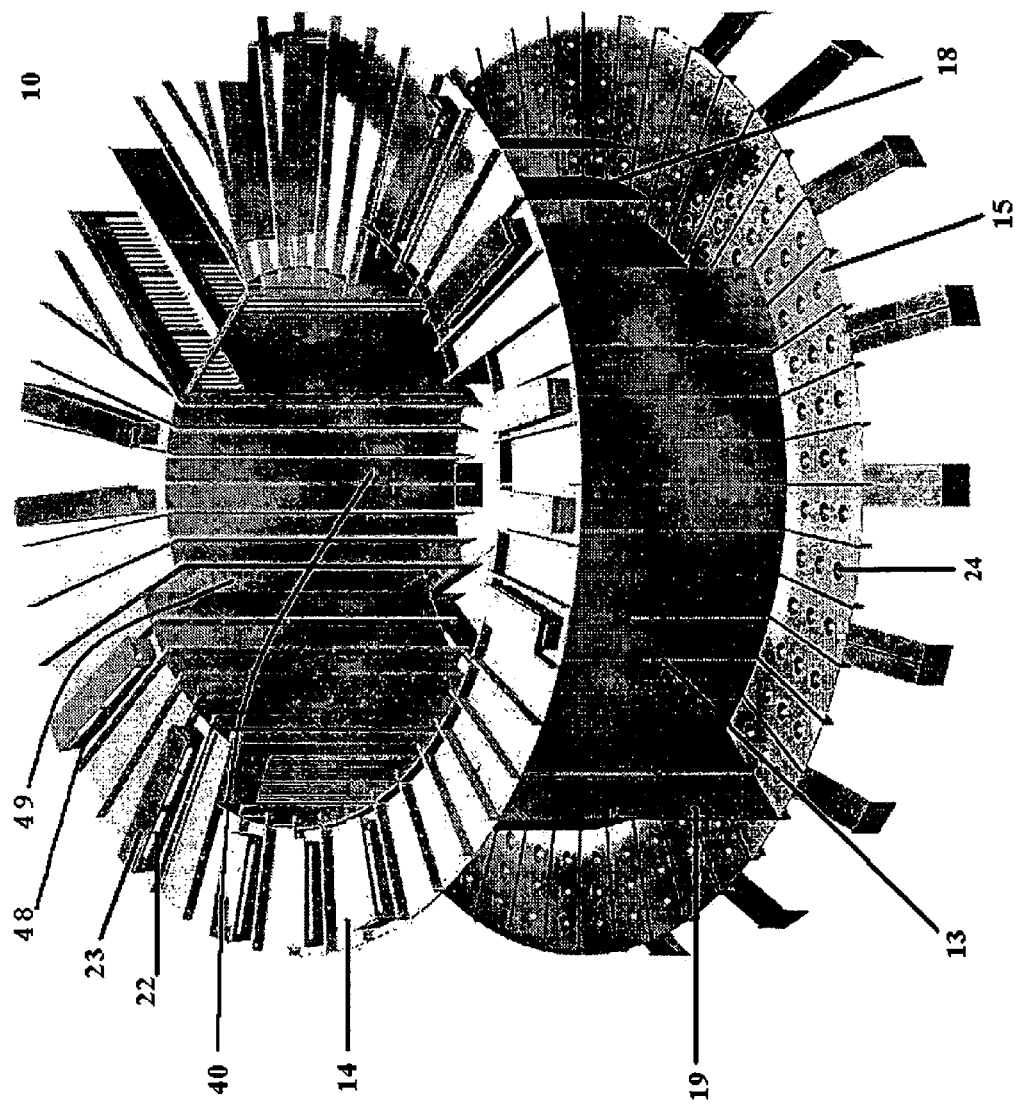
FIG. 2 shows a preferred vapor distribution flute of the present invention without the exterior wall of the column depicted.

As is shown in FIGS. 1, 2 and 4, the vapor flow moves circumferentially around the channel within the vapor distributor (10) through the use of a plurality of deflector plates (18a, 18b, 18c, 18d) extending from the interior deflector wall (13). These deflector plates (18a, 18b, 18c, 18d) additionally force the vapor flow towards the outside of the channel (11) towards a rear wall or baffle (19) that stops and deflects the vapor flow back against the initial direction of vapor flow. Preferably, the column contains from about 1 to about 10 deflector plates, spaced approximately evenly in the vapor flow channel (11). In preferred embodiments, at least one deflector plate is provided for each zone of varying channel radius as described more fully herein below.

Vapor flow is separated from the solids and liquids and removed from the channel though multiple means. The first means comprises windows (20) provided in the interior deflector wall (13). The windows (20) are equipped with louvers (21) to control the rate at which vapor can exit the channel (11). In preferred embodiments, the number of windows (20) and their size range from about 10 to about 30. Likewise, when louvers (21) are provided, they are sized to be from about 150×600 mm to about 250×2000 mm. The vapor exiting the channel (11) via windows (20) flows into an open area (40) of the column formed by the annular construction of the vapor distributor (10). The vapor then proceeds upwardly to contact packing or trays of the column located above the vapor distributor. In a preferred embodiment of the present invention, the interior deflector wall (13) is segmented to provide varying channel widths at several locations. The segmentations graphically are depicted in FIG. 3 wherein it is shown that the interior deflector wall (13) makes an almost 90° turn inwardly for a short run and then makes another almost 90° turn and continues radially parallel to the exterior column wall (12). A window (20) is located at each segmentation between the almost 90° turns of the interior deflector wall (13). The interior deflector wall (13) then continues towards the back of the vapor distributor until the next segmentation and window (20). At each segmentation, the channel (11) becomes narrower. Also in the preferred embodiments, at least one deflector plate (18) may be provided at each segmentation. In a preferred embodiment of the present invention, for each inlet feed nozzle, the channel is provided with three segmentations, although from about one to about 5 segmentations may be provided. As shown in FIGS. 3 and 4, a column with two nozzle inlets (16, 17) is provided with three channel segments (42a, 42b, 42c) for inlet feed nozzle (16) and three channel segments (44a, 44b, 44c) for inlet feed nozzle (17) with deflector plates (18a, 18c, 18c and 18d) at each channel segment.

With reference to FIG. 4, illustrated are primary deflector plates (18a, 18b) extending from the interior deflector wall (13) at a position before the first window (20). Primary deflector plates (18a, 18b) force the initial vapor flow toward the outside of the vapor flow channel (11). The remaining deflector plates (18c, 18d) extend radially towards the inlet feed nozzles from the sections of the interior deflector wall (13) adjacent the windows (20).

Additional means by which the vapor flow is separated and directed into the interior open area (40) of the column from the vapor distributor (10) are located in the ceiling (14) of the channel (11). FIGS. 1-3 show the ceiling (14) comprising chimneys (22) that allow the vapor to flow out of the distributor and into the interior open area (40) of the column. The chimneys (22) further are equipped with high hats (23) to regulate the rate at which vapor flow is allowed to leave the channel (11) through the chimneys (22). Preferably, the number of chimneys (22) ranges from about 1 to about 3 per meter of length of the vapor channel (11). The chimneys (22) have a surface area ranging from about 0.1 to about 0.4 m² and the high hats (23) are constructed from about 100 to about 300 mm above the chimneys (22) and have a surface area ranging from about 0.03 to about 0.2 m².

Figure 7:
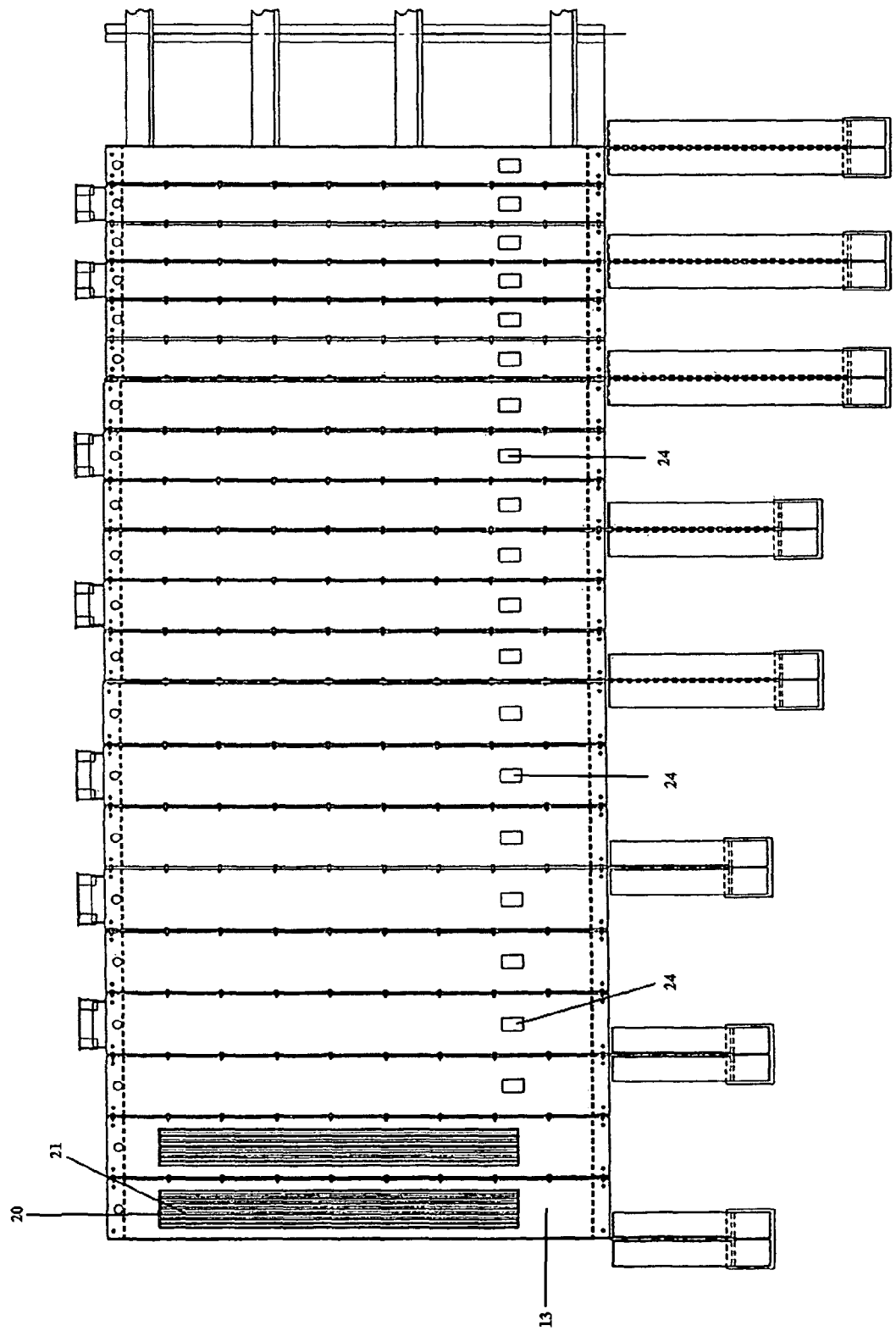
FIG. 7 shows an additional view of the deflector walls for use with a preferred vapor distribution flute of the present invention.
Figure 8:
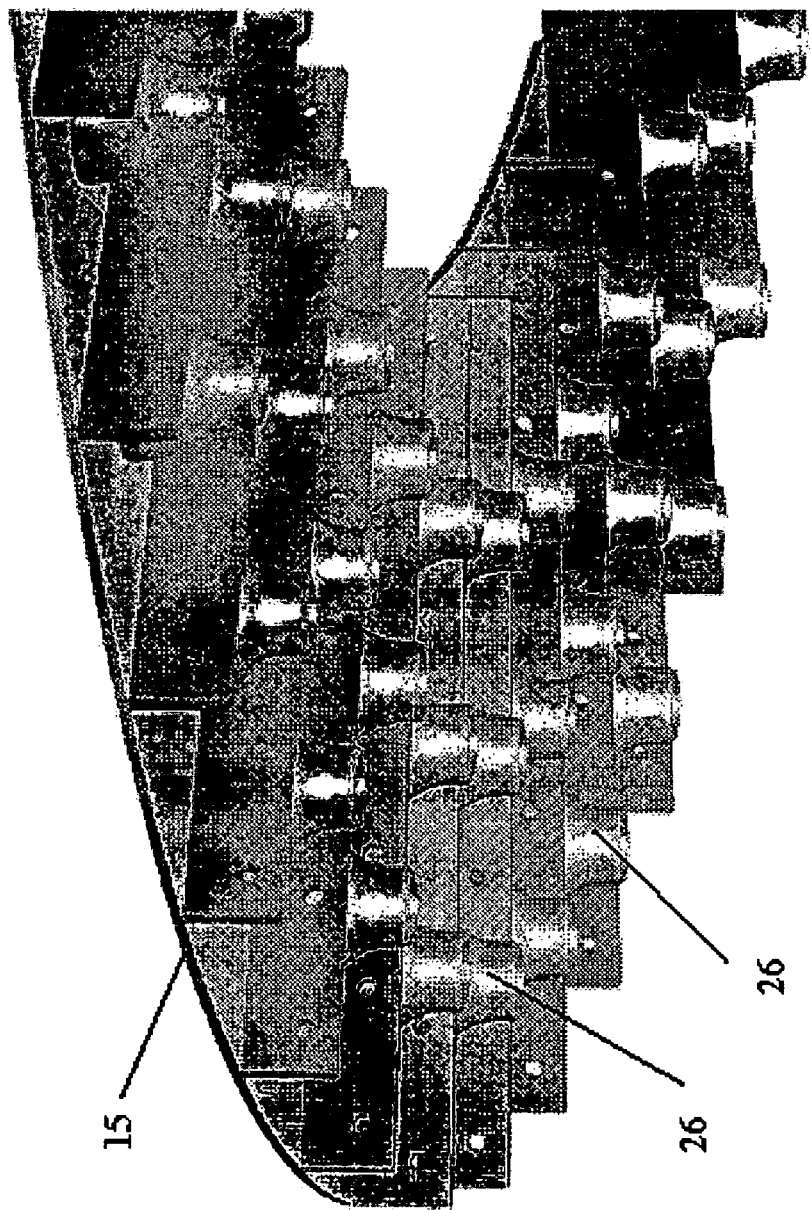
FIG. 8 shows the floor of a preferred vapor distributor of the present invention highlighting the conical discharge ports.

FIG. 7 shows the interior walls (13) of the vapor distributor comprising vertical overflow openings (24), which feed into a column sump (25) (see FIGS. 1 and 2) located below the floor (15) of the vapor distributor (10). The overflow openings (24) allow for drainage of liquid that has been separated from the vapor into the sump (25) in case the conical drainage nozzles (26) are flooded. Preferably the number of overflow openings (24) range from about 20 to about 60, the overflow openings (24) have a size ranging from about 0.01 to about 0.02 m² and they are located at a height ranging from about 50 to about 200 mm from the floor (15).

FIGS. 1, 2, 5 and 8 show the floor (15) of the vapor distributor (10) comprising conical drainage nozzles (26), which allow for solids and liquids to be removed from the channel (11). Preferably, the number of conical drainage nozzles (26) ranges from about 100 to about 400, and they have a size ranging from about 25 mm to about 100 mm. The vertical openings (24) and the conical drainage nozzles (26) allow for the regulation of the level of liquid present in the vapor distributor, initially liquid will pass through the conical drainage nozzles (26), but if flooding of the device were to occur, the liquid will be removed from the channel through the overflow vertical openings (24).

The vapor distributor (10) serves to separate and distribute the vapor stream evenly over the lower packing or trays of the column. In a process in accordance with the present invention, a multiphase vapor stream is introduced into the column through a vapor inlet nozzle (16, 17) and enters the vapor channel (11). The multiphase vapor stream flows into the channel (11) and around the inner periphery of the vapor distributor (10) and is split into a plurality of smaller streams that are distributed into the column interior (40) through the windows (20) and chimneys (22). The distributed vapor streams then ascend in the open column interior (40) of the column and feed into the packing or trays positioned above the vapor distributor 10. In the case of a vapor/liquid mass transfer system, the vapor entering the packing trays encounters and interacts with a liquid stream that has been introduced into the column at a location above the packing or trays. Notably, because the vapor entering the interior area of the column containing the packing or trays uniformly has been distributed across the horizontal cross-section of column, the interaction between the vapor and liquid in the packing or trays greatly is facilitated, particularly in the lower portions of the packing or trays.

A preferred embodiment of the present invention comprises chamfered, or beveled, interior deflector walls (13). The interior deflector wall, as described in FIGS. 1-3, contains perpendicular steps formed where the internal radius of the vapor channel (11) is reduced. These interior deflector walls (13) were stair shaped to make the transition between a radius and the next larger one easy to fabricate. In order to reduce turbulence formed at these perpendicular corners, which may result in significant and unnecessary pressure losses to the fluid circulating inside, the present inventors have proposed streamlining of the interior deflector walls (13). Such streamlining, where desired, reduces the turbulence of boundary layer separation and the secondary eddy currents that may result from the shape of the interior deflector walls (13). In an especially preferred embodiment, streamlining may be accomplished by using a chamfered design to the area of the interior deflector walls (13) where the radius of the vapor channel is reduced. Chamfering creates a more gradual change in velocity and significantly reduces turbulence and pressure losses of the necessary flow contraction.

Figure 15:
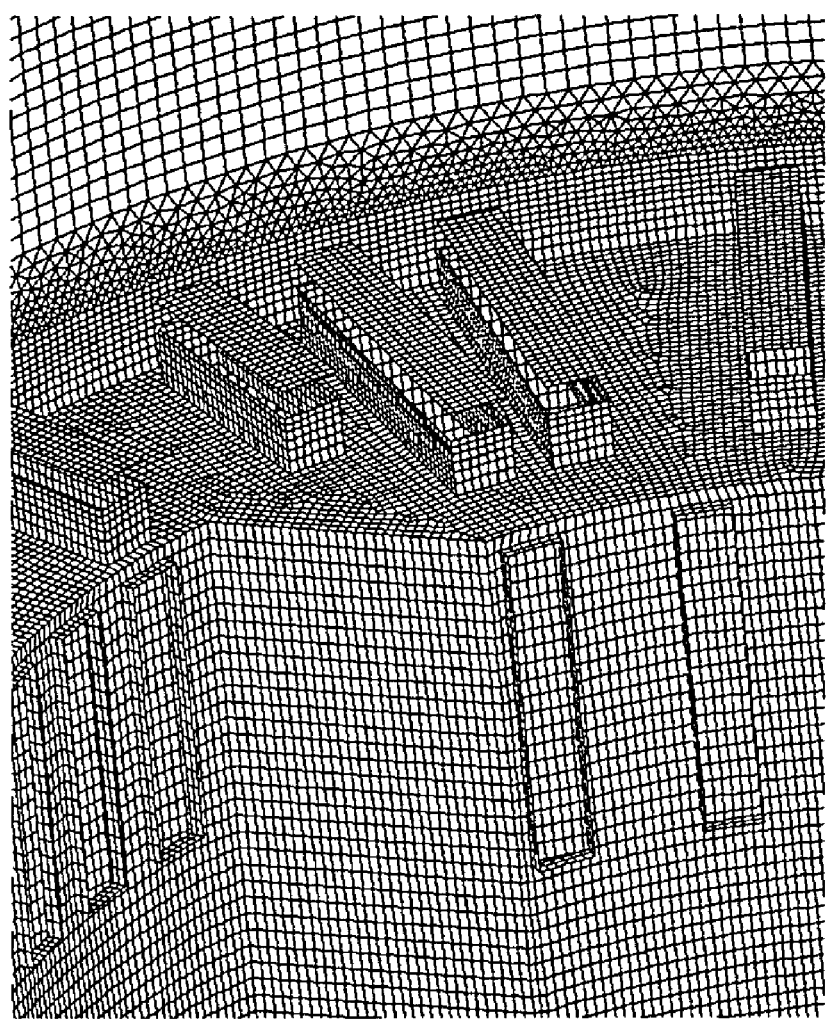
FIG. 15 is an illustration of the chamfered interior deflector walls.

In one embodiment, chamfering may be effected by constructing the stepped region of the interior deflector walls (13) of the flute at angles by various degrees less than 90°. Preferred chamfered interior deflector walls are illustrated in FIG. 15.

Use of chamfered interior deflector walls in accordance with the present invention reduces turbulence intensity by about 50% over non-chamfered deflector walls. This likewise results in a further lowering of the pressure drop, which is one of the benefits of the present invention.

Another preferred embodiment of the present invention employs a continuous internal chamber in the vapor flute. In this continuous internal chamber embodiment, the vapor flow is allowed to mix throughout the internal chamber. The present inventors have found that in the previously described embodiments of the present invention (see FIG. 1-3 for example), the rear baffles limited the movement of vapors from one side of the flute to another. When these baffles are removed, the pressures are allowed to equalize and flow distribution is improved because the equalized pressures create more even distributions and a lower pressure drop.

Additionally, in vapor flute designs of preferred embodiments of the present invention that employ multiple inlet vapor nozzles, another preferred feature is to not have any separating elements located in the internal chamber of the vapor flute directly between the two inlet vapor nozzles. In FIG. 4, there is an area between the two inlet vapor nozzles where vapor flow cannot proceed. In the present preferred embodiment, the internal chamber would be a complete circle with no separating elements. By proceeding with this preferred feature, removal of the rear baffle and provision of the separation area between the two inlet vapor nozzles, decreased the pressure drop by about 20%.

In preferred embodiments of the present invention, the windows (20) with louvers (21) and/or chimneys (22) with high hats (23) of the present invention may be fitted with filtration and/or separation elements (48, 49) such as, knit mesh pads or other filter media to increase the distribution of the multi-phase mixture. Also, the vapor inlet (16, 17) optionally may be fitted with a cyclonic or vane type filtration and/or separation element (50). These filtration and/or separation elements (48, 49, and 50) can practically eliminate the liquid and/or solid phase contaminants in the feed gas while the vapor flute serves as the distributor/contactor of gas to the vessel internals.

A numerical computer model study was conducted to analyze the effects of the vapor flute distributor design on the gas flow in the present invention.

The conclusions from this study are based upon results obtained from three-dimensional computational fluid dynamics flow simulations. These conclusions illustrate the effectiveness of a vapor flute design in accordance with the present invention in providing uniform gas distribution to the trays of a gasoline fractionator.

Figure 9:
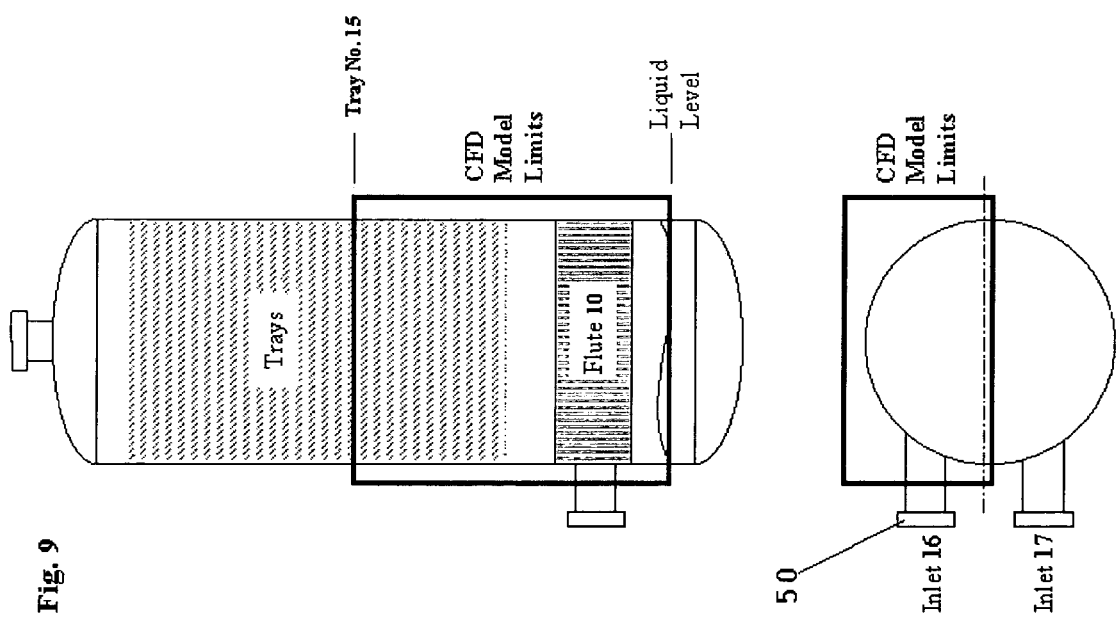
FIG. 9 shows a vapor distributor inside a fractionation column and a cross sectional view of the vapor distributor within the column.

A schematic diagram representing the vapor distributor and a gasoline fractionator column is presented in FIG. 9. The portion of the vessel included in the computational models of this study is identified by the boxes in FIG. 9.

The flow conditions used in this analysis are presented in Table I. These conditions are applied to inlet (16). The second inlet (17) is considered perfectly symmetrical and is not included in this analysis.

TABLE I

Flow Conditions

| | |
|---|---|
| Inlet Gas Flow Rate | 274,393 Kg/hr |
| Gas Density | 1.401 Kg/m$^3$ |
| Gas Viscosity | 0.02 cP |
| Pressure drop across the trays | 0.1 psi per tray |

This study is based upon numerical solutions of the full Navier-Stokes equations with the K-$\epsilon$ model of turbulence, as utilized in FLUENT™, Versions 5.4 and 6.0 (FLUENT™ is a registered trademark of Fluent, Inc., Lebanon N.H.). Three-dimensional unstructured, hybrid grids are used to model the flow in the vertical vessel.

The following assumptions were used in the study and are based upon the physics of the fluid flow in the vessel.
  a) The flow is steady and incompressible.
  b) The flow is isothermal.
  c) The gas velocity profile at the inlet is uniform.
  d) The defined computational grids accurately can represent the geometry of the system. For the model without a vapor distributor the grid size was 57489 and for the model without a vapor distributor the grid size was 491312.
  e) The bottom six trays (Tray 15 to Tray 20) are included in the model and are represented as porous media.
  f) The flute is modeled in its macro details. Micro details, however, (conical liquid discharge ports and vapor outlets) are represented as porous media.
  g) The liquid level at the bottom of the vessel is considered stationary and is modeled as a wall.
  h) The liquid flow into the vessel is not included in this work.

Two different models are investigated in this analysis. The first model does not contain a vapor distributor and the second model contains a vapor distributor of the present invention.

Figure 10:
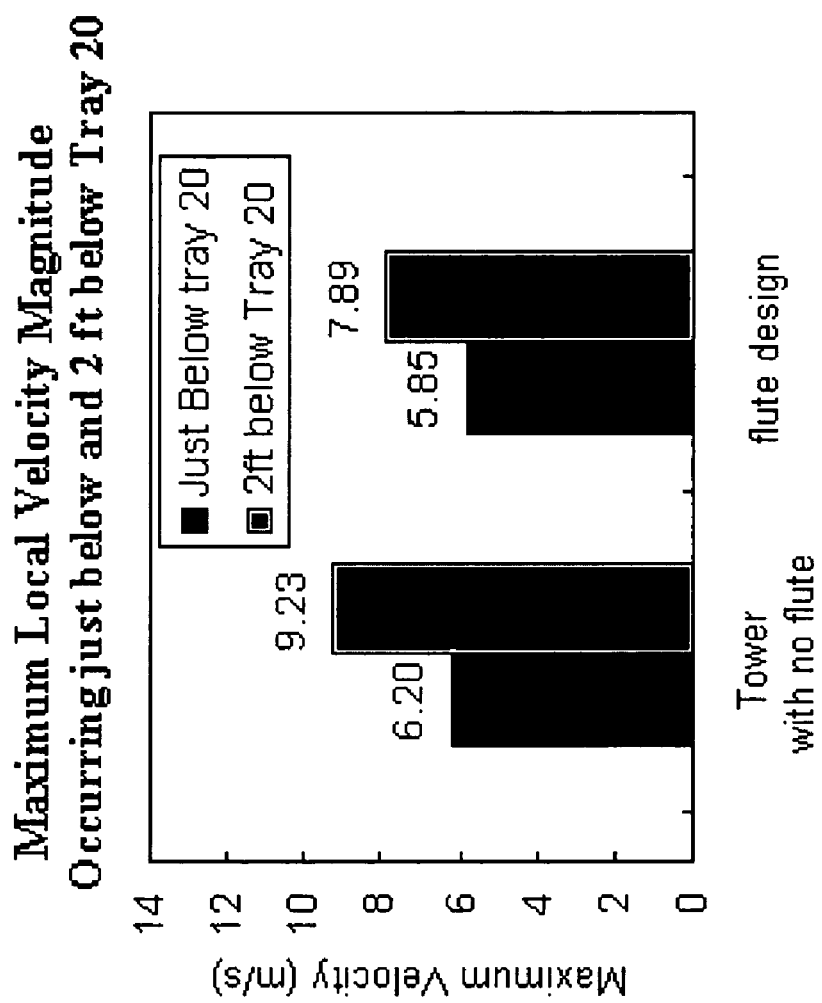
FIG. 10 is a chart of maximum local velocity magnitudes beneath the trays depicted in FIG. 9.

Just below and 2 ft below the bottom tray (Tray 20), the maximum local velocity magnitudes are obtained from the numerical simulations. These velocities are presented in FIG. 10. The vapor flute design of the present invention is shown in FIG. 10 to decrease significantly the maximum local velocity below Tray 20 and, therefore, improve the velocity profile below this tray. The improved velocity profile is expected to, in turn, improve the effectiveness of this bottom tray.

Figure 11:
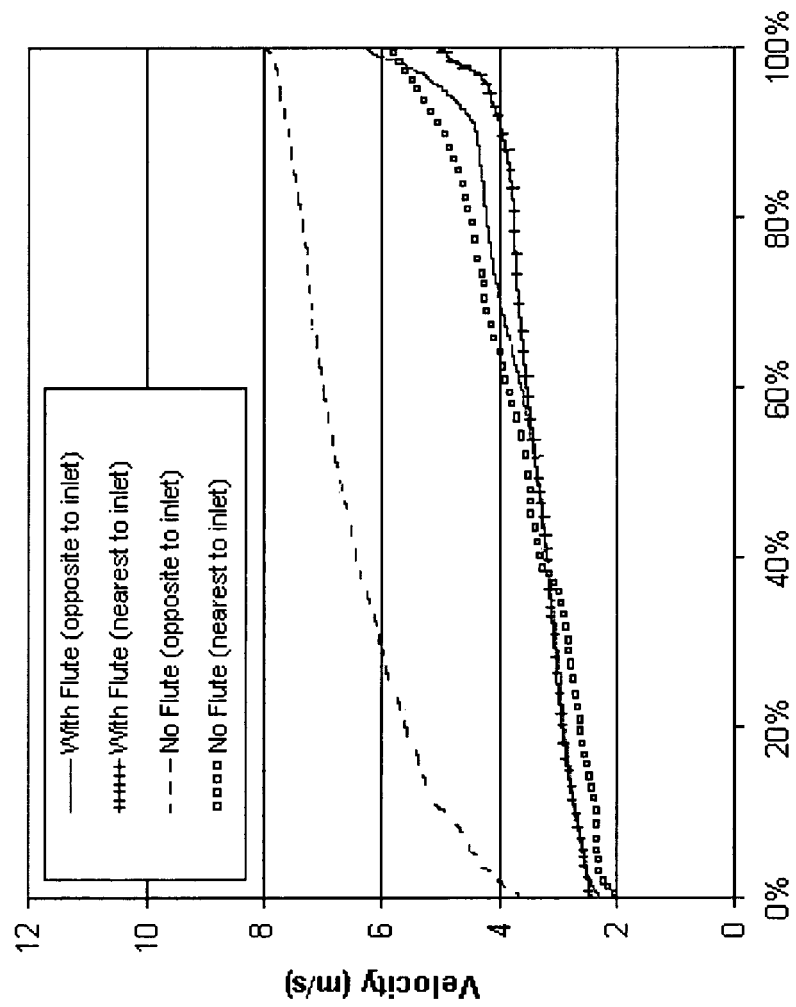
FIG. 11 is a plot of velocity magnitudes below tray 20 as depicted in FIG. 9 at different locations underneath the trays with and without the flute.

To further illustrate the effectiveness of a vapor flute design in accordance with the present invention, velocity magnitudes just below tray 20 are sorted and plotted in FIG. 11 versus the tray area with no flute and with the flute design of the present invention. The curves shown in this figure represent the velocities in each half of tray 20 individually. The straight line and line with hash marks represent the model with a vapor distributor of the present invention. The line with hash marks represents the velocities in half of the vessel closest to the inlet while the straight line represents the velocities in the other half. Similarly, the dotted line and line of squares represent the model without a vapor distributor in these two halves as identified in FIG. 11.

Figure 12:
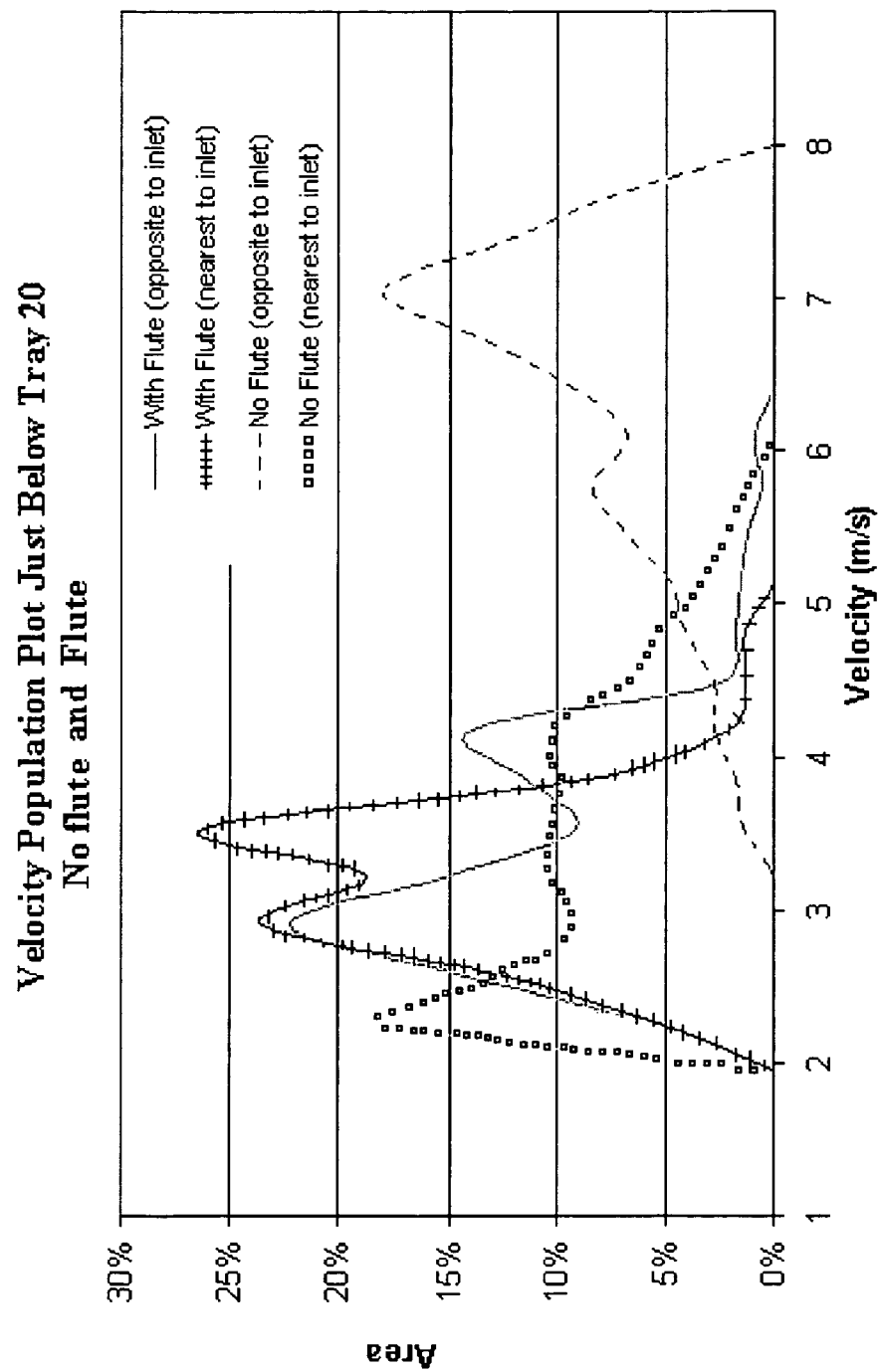
FIG. 12 is a plot of velocity populations below tray 20 as depicted in FIG. 9 at different locations underneath the trays with and without the flute.

A population plot of the velocity magnitudes just below tray 20 is shown in FIG. 12. This figure illustrates a highly mal-distributed profile of the velocity magnitude in Tray 20. Specifically, the dotted line and the line of squares represent the model without a flute in the half of Tray 20 opposite to the inlet and near the inlet, respectively. These two curves illustrate that a high percentage of the tray area operates at divergent velocities (between 6 and 8 m/s on one side and between 2 and 3 m/s on the other side). When the flute design of the present invention is included, however, the straight line and the line with hash marks illustrate that the majority of the tray area experiences similar velocities between 2.5 and 4.5 m/s.

Figure 13:
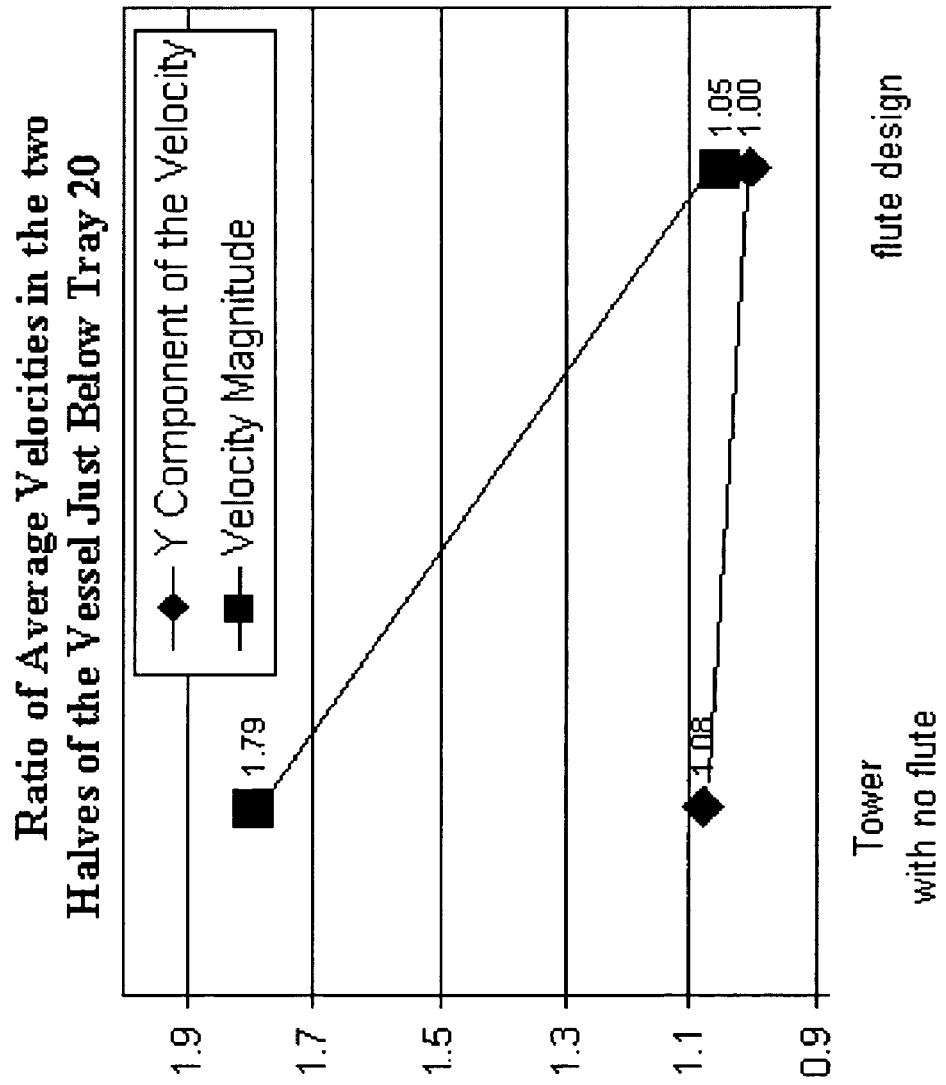
FIG. 13 is a plot of the velocity magnitudes just below tray 20 in the two halves of the trays with and without the flute.

The average velocities (magnitude and y-component) in each half of Tray 20 are calculated. The ratio of these two averages also is calculated and plotted in FIG. 13. The vapor flute of the present invention provides a much lower ratio as compared to the case with no flute. This illustrates that the gas flow rates in the two halves of Tray 20 are comparable. With the comparable flow rates, the expected effectiveness of Tray 20 significantly is enhanced.

Figure 14:
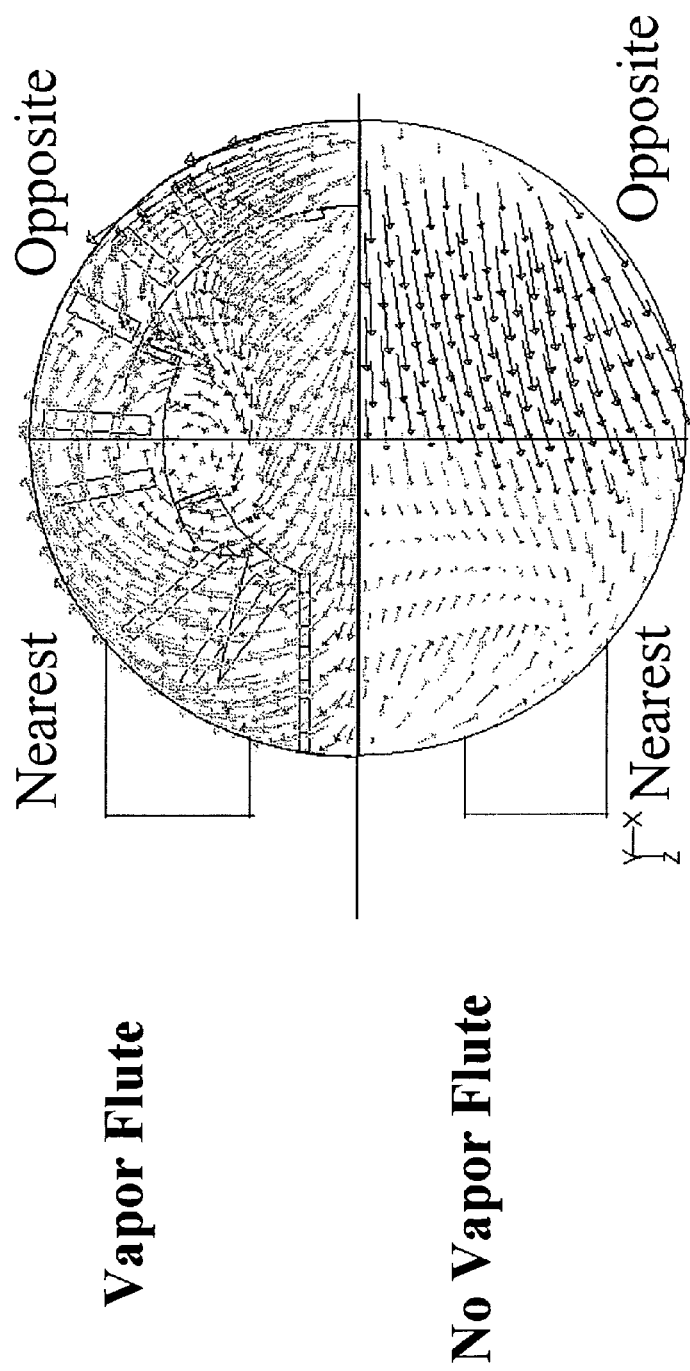
FIG. 14 is an illustration of the direction of gas flow under tray 20 in a system with a vapor distributor and in a system without a vapor distributor.

FIG. 14 is an illustration of the direction of gas flow under tray 20 as can be seen in a system with a vapor distributor and in a system without a vapor distributor. The arrows represent the direction of gas flow in the system, and in the top half of the figure the vapor distributor of the present invention is depicted altering the gas flow.

While certain preferred and alternative embodiments of the invention have been set forth for purposes of disclosing the invention, modifications to the disclosed embodiments may occur to those who are skilled in the art. Accordingly, the appended claims are intended to cover all embodiments of the invention and modifications thereof which do not depart from the spirit and scope of the invention.

The above mentioned patents, publications and computer program hereby are incorporated by reference.

We claim:

1. A multiphase vapor distributor for separation of a mixed vapor phase, said multiphase vapor distributor located within a column comprising a sump and an inlet feed passage, wherein said multiphase vapor distributor is generally annular in construction and has a generally vertical center axis, said multiphase vapor distributor comprising at least a top section, a bottom section and an internal wall connecting said top section and said bottom section; wherein said bottom section comprises at least one opening to said sump, said internal wall comprises at least one opening into an interior space of the annular distributor and said top section comprises at least one opening into an upper region of said column; wherein at least one chamber is formed between an exterior wall of said column, said internal wall, said top section and said bottom section of said multiphase vapor distributor, and wherein said multiphase vapor distributor is adapted to accommodate passage of said multiphase vapor from said inlet feed into said chamber.

2. The multiphase vapor distributor according to claim 1, wherein said internal wall further comprises at least one baffle, which extends perpendicular from said internal wall of said multiphase vapor distributor to said exterior wall of said column.

3. The multiphase vapor distributor according to claim 1, wherein the distance between said internal wall of said multiphase vapor distributor and said exterior wall of said column varies.

4. The multiphase vapor distributor according to claim 1, wherein said internal wall comprises at least one opening for passage of liquid and solid material out of said distributor and at least one opening for passage of vapor out of said distributor.

5. The multiphase vapor distributor according to claim 1, wherein said opening in said bottom section is conical.

6. The multiphase vapor distributor according to claim 1, wherein said multiphase vapor distributor comprises at least two chambers.

7. The multiphase vapor distributor according to claim 6, wherein each of said chambers is adapted for receiving a separate inlet feed.

8. The multiphase vapor distributor according to claim 4, wherein said opening in said internal wall for vapor movement further comprise fixed or movable shutters.

9. The multiphase vapor distributor according to claim 1, wherein said opening in said top section further comprises vapor chimneys with high hats.

10. A multiphase vapor distributor for a mass transfer and/or a heat exchange column comprising: a column comprising an open internal shell and having a generally vertical center axis; at least one vapor inlet nozzle extending through said column shell for directing a multiphase vapor stream in a generally circumferential direction into a generally annularly-shaped multiphase vapor distributor within said column; said multiphase vapor distributor comprising an annular upright interior deflecting surface spaced radially inwardly from said vapor inlet nozzle and a ceiling and a floor extending between said internal deflecting wall and said column shell to substantially close the top and bottom of the distributor; wherein said ceiling comprises at least one opening; said floor comprises at least one opening and said interior wall comprises at least one opening.

11. The multiphase vapor distributor according to claim 10, wherein said deflecting surface is shaped and positioned in relation to said vapor inlet nozzle to direct a vapor stream circumferentially around an outer periphery of the column interior.

12. The multiphase vapor distributor according to claim 11, wherein said multiphase vapor distributor comprises baffles, which project perpendicular from said deflecting wall.

13. The multiphase vapor distributor according to claim 12, wherein said deflector plates are positioned within said vapor distributor in spaced relationship from the vapor inlet nozzle.

14. The multiphase vapor distributor according to claim 12, wherein said interior wall openings comprise windows positioned throughout the internal deflecting wall.

15. The multiphase vapor distributor according to claim 12, wherein said ceiling openings comprise chimneys positioned throughout said ceiling.

16. The multiphase vapor distributor according to claim 12, wherein said floor openings comprise conical outlet nozzles located in said floor.

17. A method of separating and distributing a multiphase vapor stream comprising vapors, liquids and solids, said method comprising feeding said multiphase vapor stream into a column comprising an open internal shell and having a generally vertical center axis; wherein at least one vapor inlet nozzle extends through said column shell directing a multiphase vapor stream in a generally circumferential direction into a generally annularly-shaped multiphase vapor distributor within said column; wherein said multiphase vapor distributor comprises a generally annular upright interior deflecting surface spaced radially inwardly from said vapor inlet nozzle and a ceiling and a floor extending between said internal deflecting wall and said column shell substantially closing said top and said bottom of said distributor; wherein said ceiling comprises at least one opening for removing and distributing a portion of said vapor to a portion of said column above said distributor; said floor comprises at least one opening for removing a portion of said solids and a portion of said liquids to a portion of said column below said distributor and said interior wall comprises at least one opening for removing a portion of said vapor and a portion of said liquid into a portion of the column located within the annular section of the distributor.

18. The method according to claim 17, wherein said deflecting surface is shaped and positioned in relation to said vapor inlet nozzle directing said vapor stream circumferentially about an outer periphery of the column interior.

19. The method according to claim 17, wherein said deflector plate is positioned within said vapor distributor in spaced relationship from said vapor inlet nozzle; wherein said deflector plate directs said multiphase vapor stream along an outer periphery of said column shell until said multiphase vapor stream reaches a rear baffle; upon reaching said rear baffle said vapor stream ceases forward movement, causing said multiphase vapor stream to back mix and exit said distributor.

20. The method according to claim 19, wherein said openings in said internal deflecting wall, comprise windows adapted for allowing a portion of said vapor to exit said distributor through the top portion of said window and a portion of said liquid to exit said distributor through a bottom portion of said window.

21. The method according to claim 19, further comprising chimneys positioned in said ceiling, said chimneys designed to allow a portion of said vapor to exit said distributor.

22. The method according to claim 19, further comprising conical outlet nozzles located in said floor of said vapor distributor designed to allow a portion of said liquids and a portion of said solids to exit said distributor.

23. A process for separating a multi phase stream into solids, liquids and vapors, said process compromising:
　a) feeding a multi phase vapor stream into a separation column comprising a vapor phase distributor;
　b) radially moving said multi phase vapor stream around a chamber of said vapor phase distributor until said multiphase vapor stream contacts a end portion of said vapor phase distributor chamber;
　c) back mixing of said multi phase vapor phase upon contact with said end portion of said vapor phase distributor chamber;
　d) removing said vapor phase from said distributor through at least one chimney opening in a ceiling of said multi phase distributor and/or a top portion of at least one window in said side wall of said vapor phase distributor;
　e) removing said liquid phase from a bottom portion of at least one window in said side wall of said distributor and through at least one opening in a floor of said distributor; and
　f) removing said solid phase through openings in the floor of said multi phase distributor.

24. The multiphase vapor distributor according to claim 3, wherein said interior deflector wall is chamfered to reduce turbulence.

25. The method according to claim 17, wherein said interior deflector wall is chamfered to reduce turbulence.

26. A multiphase vapor distributor according to claim 3, wherein said chamber is not blocked or divided.

27. A method according to claim 17, wherein said chamber is not blocked or divided.

28. The multiphase vapor distributor according to claim 10, wherein said interior deflector wall is chamfered to reduce turbulence.

29. A multiphase vapor distributor according to claim 10, wherein said chamber is not blocked or divided.

30. A multiphase vapor distributor according to claim 1, wherein one or more of said openings further comprises a filtration and/or separation element.

31. A multiphase vapor distributor according to claim 10, wherein one or more of said openings further comprises a filtration and/or separation element.

32. A method according to claim 17, wherein one or more of said openings further comprises a filtration and/or separation element.

* * * * *